United States Patent
Ragsdale

[15] 3,678,950
[45] July 25, 1972

[54] METHOD AND APPARATUS FOR PUMPING SLUGS OF COOL SLURRY WITHOUT PASSING SLURRY THROUGH THE PUMPING STATION

[72] Inventor: Harold E. Ragsdale, San Mateo, Calif.
[73] Assignee: Bechtel International Corporation
[22] Filed: Dec. 3, 1970
[21] Appl. No.: 94,831

[52] U.S. Cl. .................................. 137/1, 137/565, 417/119
[51] Int. Cl. .......................................................... F04f 1/06
[58] Field of Search .............. 137/1, 12, 13, 268, 565, 566; 73/219; 417/119, 143

[56] References Cited

UNITED STATES PATENTS

| | | |
|---|---|---|
| 2,957,484 | 10/1960 | Nordin .................................. 137/1 |
| 3,212,116 | 10/1965 | Gentry ............................. 137/268 X |
| 3,397,576 | 8/1968 | Peres .................................. 73/219 X |

Primary Examiner—William B. Cline
Attorney—Eckhoff and Hoppe

[57] ABSTRACT

A slurry is drawn into a main pipeline by pumping liquid ahead of it to draw the slurry into the main pipeline. The liquid in the main pipeline is simultaneously forced into a second pipeline to force a slug of slurry ahead of it. When the main pipeline is completely filled with slurry, a slug of liquid is drawn from the first pipeline and is forced into the main pipeline to force the slug of slurry on into the second pipeline.

3 Claims, 3 Drawing Figures

Patented July 25, 1972

INVENTOR.
HAROLD E. RAGSDALE
BY
ATTORNEYS

INVENTOR.
HAROLD E. RAGSDALE
ATTORNEYS

METHOD AND APPARATUS FOR PUMPING SLUGS OF COOL SLURRY WITHOUT PASSING SLURRY THROUGH THE PUMPING STATION

BACKGROUND OF THE INVENTION

It is well-known to form an aqueous slurry of various solid materials such as coal, petroleum coke, iron concentrates and sulfur. When such a slurry is pumped, considerable attrition of the pumps and the valves included in the pumping system necessarily occurs.

SUMMARY OF THE INVENTION

In accordance with the present invention, a slurry is moved through a pipeline over a desired distance by utilizing a liquid to provide the moving force. The slurry does not pass through any pumps or valves in the pumping system and in this way attrition of the pumping system is avoided.

In a typical operation setup embodying the present invention, for example, a batch or slug of a liquid such as a crude oil from 1 to 10 miles in length is introduced into a pipeline followed by a batch of the slurry to be transported, the batch or slug of slurry being of the same length as the oil slug. Alternate batches or slugs of the oil and of the slurry are provided down the length of the pipeline. In accordance with this invention, the only substance passed to the pumps and forced through the valves in the pumping system is the liquid. At the pumping station, the piping is preferably arranged with double suction and double discharge lines to operate alternately. The take-off distance between the two suction lines and the two discharge lines along the mainline is approximately equal to the length of each of the batches or slugs moved through the pipeline.

It is in general the broad object of the present invention to provide a pumping system and method of procedure whereby a slurry can be moved successfully through a length of pipeline utilizing a pumping system which is not subject to abrasion by the slurry.

BRIEF DESCRIPTION OF THE DRAWINGS

FIGS. 2 and 3 are, respectively, diagrammatic showings of the alternative valving arrangements for the pipeline, FIG. 2 illustrating the valve and piping arrangement utilized when the liquid is being moved through the main pipeline followed by a batch or slug of the slurry while FIG. 3 illustrates the valve and piping arrangement when the slurry is being moved through the main pipeline under the pressure of the following liquid which is undergoing pumping.

DESCRIPTION OF THE PREFERRED EMBODIMENT

Figure 1:
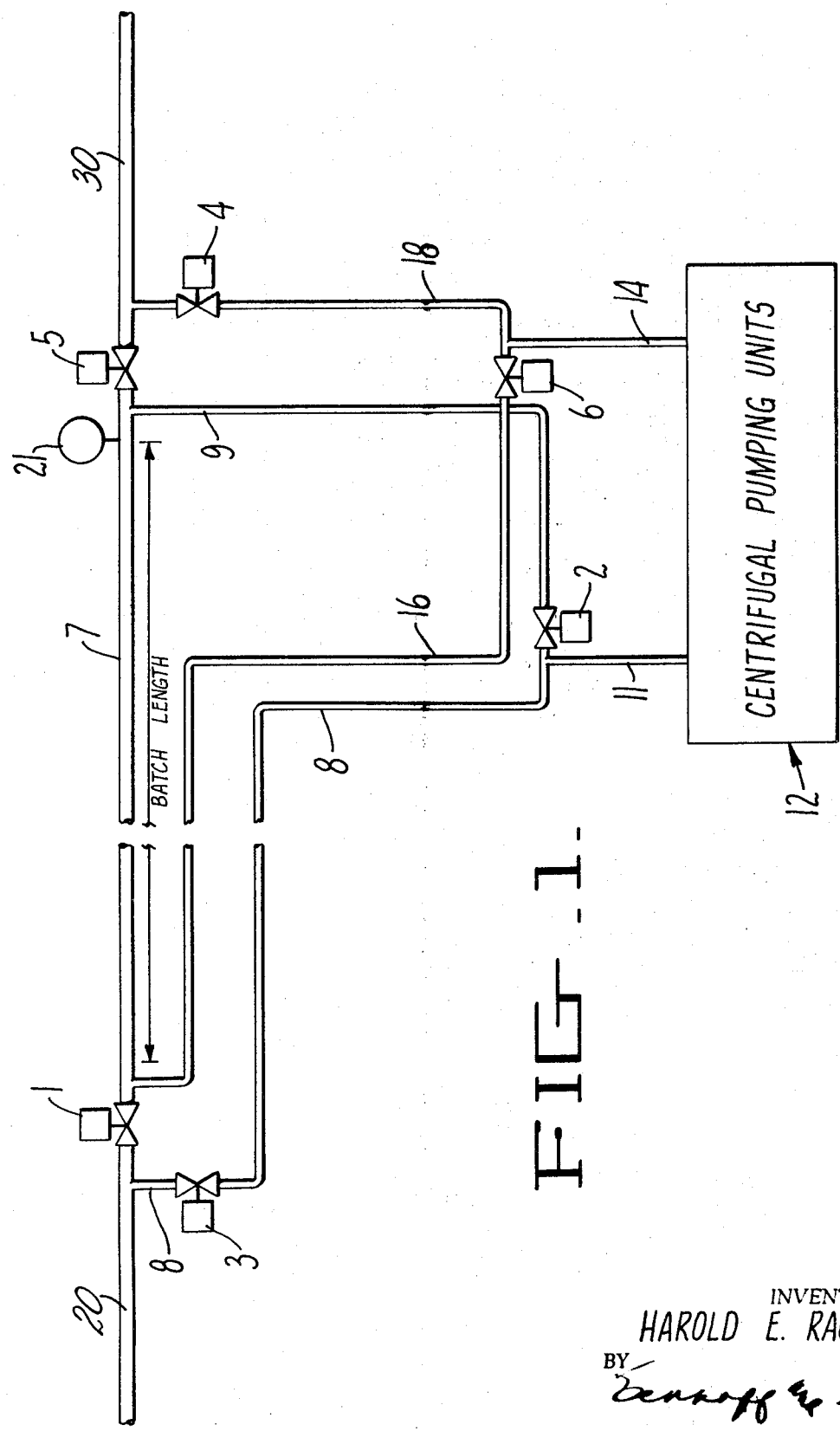
FIG. 1 is a diagrammatic showing illustrating the overall apparatus setup utilized in accordance with the present invention.
Figure 2:
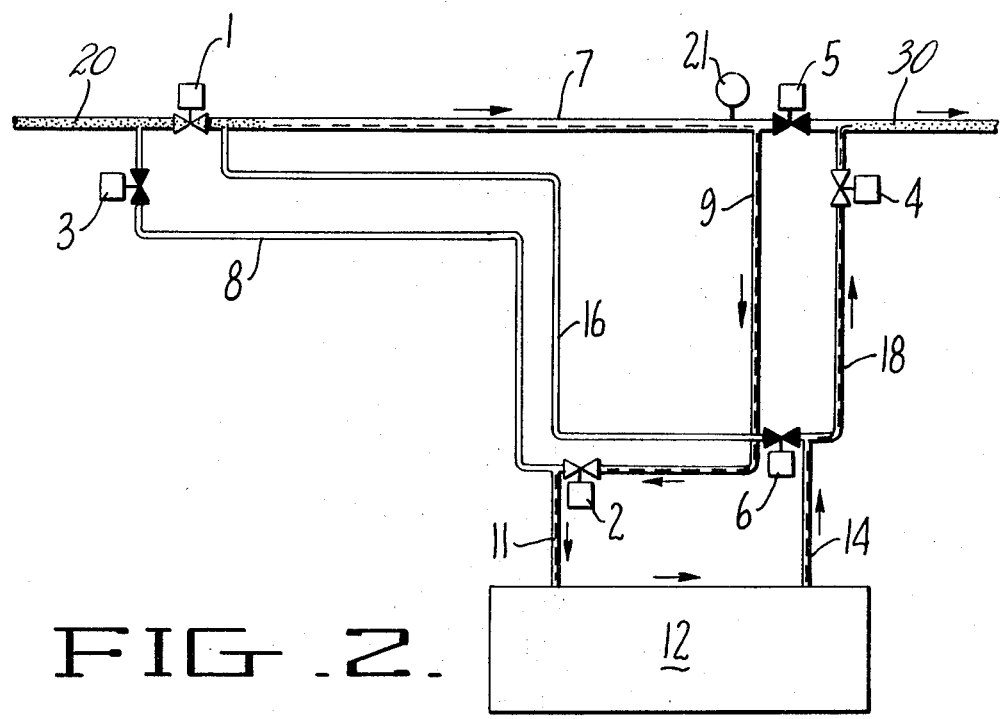

Referring to the drawings, the main pipeline is indicated by numeral 7. Flow through the main pipeline is controlled by valves 1 and 5 provided at opposite ends of the mainline, the distance between these being of the order of ten miles, for example. Valve 1 controls the flow into the main pipeline 7 from pipeline 20, while valve 5 controls the flow from the main pipeline into pipeline 30. Thus, there are three pipelines involved, the first being indicated at 20, the second or main pipeline being indicated at 7 and the third being indicated at 30. Suction line 8 is connected to the main pipeline 7 ahead of valve 1, flow through this line being controlled by valve 3. A second suction line 9 is provided downstream on the main pipe-line and close to but ahead of valve 5. Flow through suction line 9 is controlled by valve 2. Suction lines 8 and 9 are connected by suction line 11 to the intake of a centrifugal pumping unit, generally indicated at 12. The outlet from the pumping unit is connected by line 14 to discharge lines 16 and 18. Flow into line 16 is controlled by valve 6 while flow through line 18 is controlled by valve 4, line 18 being connected downstream of valve 5. A density meter 21 is provided upstream of but adjacent to valve 5 to sense the density of the fluid in the main pipeline at its point of connection.

The apparatus, therefore, comprises a main pipeline 7, the length of which is measured in miles, a pumping station 12, a first valve 1 at the upstream end of the main pipeline to control flow into the main pipeline from the first pipeline 20, a second valve 5 at the downstream end of the main pipeline to control flow from the main pipeline into the second pipeline 30, a first suction line 8 extending parallel to the main pipeline from the upstream end of the main pipeline in advance of the first valve 1 to the downstream end of the main pipeline in advance of the second valve 5, a third valve 3 in the suction line adjacent the main pipeline 7, a second suction line 11 extending from the first suction line 8 to the pumping station 12, a fourth valve 2 in the first suction line 8 between the second suction line 11 and the connection of the first suction line 8 to the main pipeline 7, a first discharge line 16-18 extending from the main pipeline 7 on the downstream side of the first valve 1 to the main pipeline 7 on the downstream side of the second valve 5, a second discharge line 14 extending from the pumping station 12 to the first discharge line 16-18, a fifth valve 6 and a sixth valve 4 each provided in the first discharge line 16-18 on opposite sides of the connection of the second discharge line 14 to the first discharge line 16-18, and means 21 connected to the main pipeline adjacent the downstream end thereof and responsive to the density of the fluid in the main pipeline 7.

In operation, when the distance between lines 16 and 9 is filled with a batch or slug of liquid, valves 3 and 5 are closed and the flow is then through line 9, valve 2 and line 11 to the instake of the pumping unit. The pumping unit discharges through line 18 to the main pipeline. This draws the following slug of slurry on to fill the main pipeline.

Figure 3:
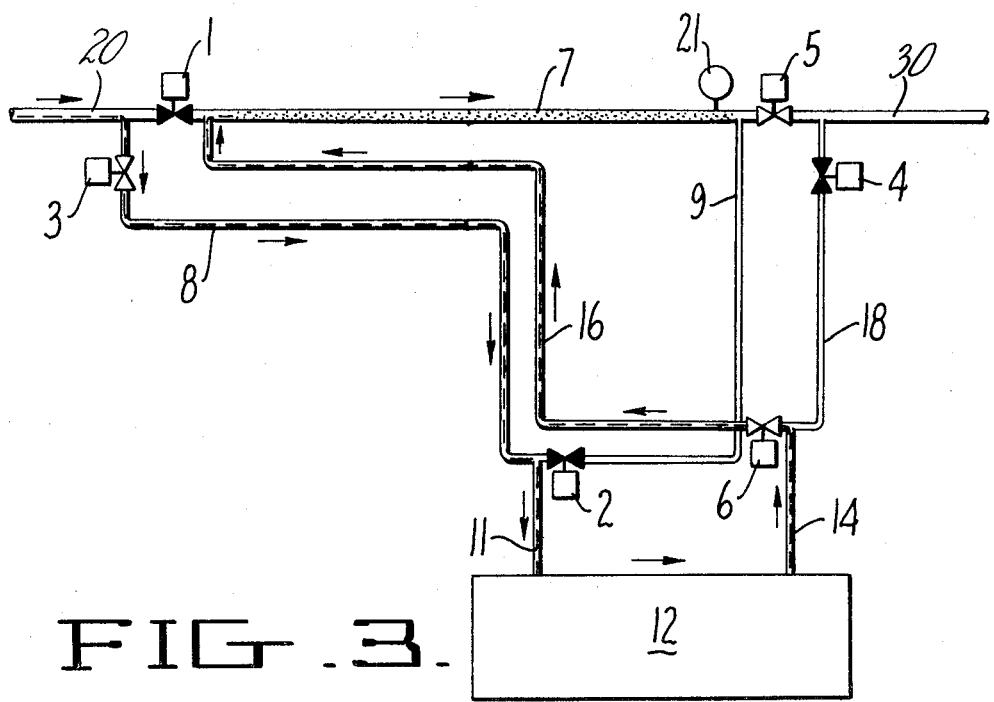

As the slug of slurry approaches the intake to suction line 9, density meter 21 senses the increase in density and signals that the valving arrangement should be changed to that shown in FIG. 3 in which valves 1, 2 and 4 are closed. Thus, the pump now draws on oil in through lines 8 and 11 and forces the oil out through lines 14 and 16 to force the slug of slurry on toward its destination.

It is believed to be apparent from the foregoing that I have provided a novel, simple and improved pumping method and system for pumping slurries containing suspended solids without the necessity of having these pass through the valves or the pumps utilized. Usually the pipeline utilized for movement of the slurry is many miles in length so that numerous unitary apparatus setups would be provided along the overall distance to move the slurry slugs from a loading station to a discharge station. The liquid used can be discharged to waste or returned for reuse.

I claim:

1. In a method of pumping a slurry through a pipeline having a first length and a second length provided respectively at the entrance end to a main pipeline and at the exit end of the main pipeline, the length of the main pipeline being measured in miles, the slurry and the liquid being provided in alternate slugs, the steps of drawing a slug of the liquid from the first length and pumping the slug of liquid into the entrance to the main pipeline to force a slug of the slurry filling the main pipeline through the main pipeline and into the second length of the pipeline, continuing drawing the slug of liquid from the first pipeline and forcing the liquid through the main pipeline until the main pipeline is filled with a slug of the liquid, and then pumping the slug of liquid filling the main pipeline into the second pipeline to force the slurry therein through the second pipeline and to draw another slug of slurry into the main pipeline from the first pipeline.

2. A pumping system for pumping a slurry with a liquid comprising a main pipeline the length of which is measured in miles and which is provided between a first pipeline and a second pipeline,
 a. a pumping station,
 b. a first valve at the upstream end of the main pipeline to continue flow into the main pipeline from the first pipeline, c. a second valve at the downstream end of the main pipeline to continue flow into the second pipeline from the main pipeline,
d. a first suction line extending parallel to the main pipeline and connected with the first pipeline at a point in advance of the first valve and with the main pipeline at a point adjacent the exit end of the main pipeline but ahead of the second valve,
e. a third valve in the suction line adjacent the first pipeline,
f. a second suction line extending from the first suction line to the pumping station,
g. a fourth valve in the first suction line provided between the connection of the second suction line to the first suction line and the connection of the first suction line to the main pipeline,
h. a first discharge line extending from a point in the main pipeline adjacent to and after the first valve in the main pipeline to a point in the second pipeline beyond the second valve,
i. a second discharge line extending from the pumping station to the first discharge line,
j. a fifth valve and a sixth valve each provided in the first discharge line on opposite sides of the connection of the second discharge line to the first discharge line,
k. and means connected to the main pipeline adjacent the downstream end thereof and responsive to the density of the fluid in the main pipeline, to signal when the valves should be controlled for controlling the fluid passing through the main pipeline.

3. A pumping system for pumping a slurry with a liquid comprising a main pipeline the length of which is measured in miles and which is provided between a first pipeline and a second pipeline,
a. a pumping station,
b. a first suction line extending parallel to the main pipeline and connected with the first pipeline at a point in advance of the main pipeline and with the main pipeline at a point adjacent the exit end of the main pipeline but ahead of the second pipeline,
c. a second suction line extending from the first suction line to the pumping station,
d. a first discharge line extending from a point in the main pipeline adjacent to and after the beginning of the main pipeline to a point in the second pipeline beyond the beginning of the second pipeline,
e. a second discharge line extending from the pumping station to the first discharge line,
f. and means operatively connected with each of said lines to effect pumping of a slurry from the first pipeline through the main pipeline and into the second pipeline in bypassing relationship to said pumping station, said means including means for withdrawing a liquid from the main pipeline through said first suction line and pumping the liquid back into the second pipeline to draw said slurry into the main pipeline, and for pumping liquid through said first discharge line into said main pipeline to push said slurry through said main pipeline.

* * * * *

UNITED STATES PATENT OFFICE
CERTIFICATE OF CORRECTION

Patent No. 3,678,950          Dated July 25, 1972

Inventor(s) Harold E. Ragsdale

It is certified that error appears in the above-identified patent and that said Letters Patent are hereby corrected as shown below:

On the cover sheet, in item [54] "Cool" should read -- Coal --.

Signed and Sealed this fifth Day of August 1975

[SEAL]

Attest:

RUTH C. MASON
Attesting Officer

C. MARSHALL DANN
Commissioner of Patents and Trademarks